(12) United States Patent
Ohshita et al.

(10) Patent No.: US 7,705,831 B2
(45) Date of Patent: Apr. 27, 2010

(54) PAD TYPE INPUT DEVICE AND SCROLL CONTROLLING METHOD USING THE SAME

(75) Inventors: Kazuhito Ohshita, Fukushima-ken (JP); Yoshiyuki Kikuchi, Fukushima-ken (JP); Kenji Watanabe, Fukushima-ken (JP); Shoji Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 721 days.

(21) Appl. No.: 11/552,819

(22) Filed: Oct. 25, 2006

(65) Prior Publication Data

US 2007/0097093 A1    May 3, 2007

(30) Foreign Application Priority Data

Oct. 28, 2005   (JP)   .............................. 2005-314463

(51) Int. Cl.
*G06F 3/041*   (2006.01)

(52) U.S. Cl. ...................................... 345/173
(58) Field of Classification Search ................ 345/173, 345/174, 177, 178; 178/18.01
See application file for complete search history.

(56) References Cited

U.S. PATENT DOCUMENTS

| | | | |
|---|---|---|---|
| 5,327,161 A | * | 7/1994 | Logan et al. ................. 345/157 |
| 5,880,717 A | * | 3/1999 | Chan et al. ................... 345/173 |
| 2002/0191029 A1 | * | 12/2002 | Gillespie et al. ............ 345/810 |

FOREIGN PATENT DOCUMENTS

JP        2000-214994        8/2000

* cited by examiner

*Primary Examiner*—Richard Hjerpe
*Assistant Examiner*—Shaheda A Abdin
(74) *Attorney, Agent, or Firm*—Brinks Hofer Gilson & Lione

(57) ABSTRACT

A pad type input device is provided. The pad type input device includes an operation surface which includes a scroll area operated by an operation body. A detector is operative to detect a touch position of the operation body placed on the operation surface as positional information on a coordinate plane. A data processor is operative to acquire an operation signal obtained by the detector to perform a predetermined process. The data processor outputs a scroll signal that moves display contents in a predetermined scroll direction when the operation body placed on the scroll area is in a stop state where the operation body does not move, even after a predetermined time elapses.

6 Claims, 5 Drawing Sheets

FIG. 6

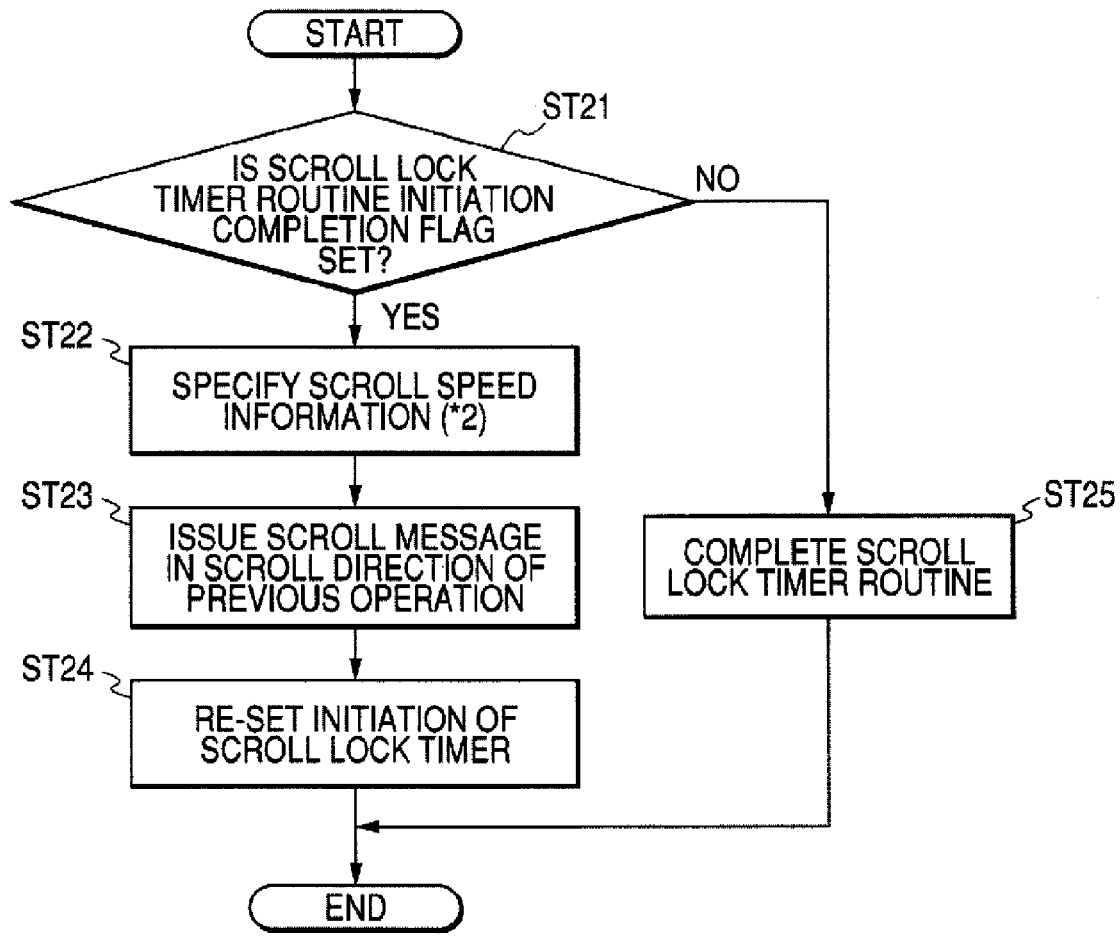

WHEN TIMER IS TURNED ON, SCROLL LOCK TIMER ROUTINE IS EXECUTED AT PREDETERMINED TIME INTERVAL

*2. SCROLL SPEED MAY BE SPECIFIED BY SOFTWARE
1) CHANGE DEPENDING ON TIME THAT FINGER IS PLACED
2) CHANGE DEPENDING ON Z-AXIS OUTPUT OF TOUCH PAD
3) CHANGE PROPORTIONAL TO NUMBER OF OBJECTS ON OPERATION SURFACE OF TOUCH PAD
4) CALCULATION BASED ON SCROLL SPEED VALUE OF PREVIOUS OPERATION
5) FIXED VALUE
6) DISTANCE FROM POSITION OF FINGER WHICH IS FIRST PLACED ON SCROLL AREA

PAD TYPE INPUT DEVICE AND SCROLL CONTROLLING METHOD USING THE SAME

This patent document claims the benefit of Japanese Patent Application No. 2005-314463 filed on Oct. 28, 2005 which is hereby incorporated by reference.

BACKGROUND

1. Field

The present embodiments relate to a pad type input device and a scroll function.

2. Related Art

In order to display a portion, which cannot be displayed in a window at one given time, on an operation screen of a personal computer, scroll for moving display contents in a window in all directions is executed.

In order to execute the scroll, for example, a point (cursor) is generally matched to a "scroll bar" displayed on the right end and the lower end of a window screen and is moved while pressing a click button.

In a pad type input device provided in a notebook type personal computer, in addition to the method, for example, a first area for horizontal scroll and vertical scroll (general scroll) and second areas for continuously executing the scroll (continuous scroll), which are disposed on the both ends thereof, are disposed on one side of the horizontal direction and one side of the vertical direction of an operation surface (pad), respectively. In such a pad type input device, when display contents are scrolled by a movement direction of a finger (operation body) that moves on the first area and the moved finger stops at any position of the second areas, the scroll is continuously executed until the finger next moves (for example, Patent Document 1).

[Patent Document 1] Japanese Unexamined Patent Application Publication No. 2000-214994.

In the conventional pad type input device, when the scroll is desired to be continuously executed, the finger need move from the first area to the second areas disposed on one end thereof by a relatively long distance. This operation is difficult for an operator.

The area of the operation surface of the pad type input device of the notebook type personal computer is relatively small. Although the first area for the general scroll and the second areas for the continuous scroll are separated in the small operation surface, the operator cannot easily recognize the boundary between the separated areas. Accordingly, it is difficult to improve operability.

Thus, a pad type input device capable of executing continuous scroll only by a simple operation on the spot is desired.

SUMMARY

The present embodiments may obviate one or more of the limitations of the related art.

In one embodiment, the pad type input device includes an operation surface which includes a scroll area operated by an operation body. A detector is operative to detect a touch position of the operation body placed on the operation surface as positional information on a coordinate plane. A data processor is operative to acquire an operation signal obtained by the detector to perform a predetermined process. The data processor outputs a scroll signal that moves display contents in a predetermined scroll direction when the operation body placed on the scroll area is in a stop state where the operation body does not move, even after a predetermined time elapses.

As broadly defined herein, a data processor is, for example, a data processing means that is capable of processing data. As broadly described herein, the detector is, for example, a detecting means or any suitable means that detects positional information of the operation body based on a change in capacitance to output an operation signal.

In one embodiment, it is possible to scroll a display screen only by a simple operation which determines a direction for sliding an operation body such as a finger and stops the operation body during a predetermined time period.

In one embodiment, the data processor is operative to acquire a movement direction of the operation body, which is previously detected, as a scroll direction and output the scroll signal including the scroll direction when it is determined that the operation body is in the stop state.

In one embodiment, the direction for previously moving the operation body can be set to the scroll direction of continuous scroll. Accordingly, the operation body need not always move to a specific area like the prior art and the continuous scroll can be executed only by slightly moving the operation body. Thus, the continuous scroll can be executed by a simpler operation.

The scroll signal may include scroll speed information that controls a scroll speed.

For example, an execution interval of a scroll lock timer routine for executing the scroll and a scroll amount for each operation can vary. Accordingly, a scroll operation can be executed at various speeds.

The scroll area may have a first scroll area for vertical scroll or/and a second scroll area for horizontal scroll.

In one embodiment, continuous scroll can be executed in a vertical direction or/and a horizontal direction. For example, when a display screen is map information, the scroll can be executed in all directions and thus the map can be easily viewed.

In one embodiment, there is provided a scroll controlling method of a pad type input device including an operation surface which includes a scroll area operated by an operation body, detecting means which detects a touch position of the operation body placed on the operation surface as positional information on a coordinate plane, data processing means which acquires an operation signal obtained by the detecting means to perform a predetermined process, and display means which displays display contents processed by the data processing means. The method includes determining whether the operation body placed on the scroll area is in a stop state where the operation body does not move, even after a predetermined time elapses; and outputting a scroll signal for moving the display contents in a predetermined scroll direction to an operating system when it is determined that the operation body is in the stop state.

In some exemplary embodiments, it is possible to continuously scroll a display screen only by a simple operation for slightly moving an operation body to specify a scroll direction and continuously stopping the operation body during a predetermined time period on the spot.

Since the operation body need not move from a specific area the other specific area, it is possible to reduce the burden of an operator.

BRIEF DESCRIPTION OF THE DRAWINGS

FIG. 6 is a flowchart showing the operation of a scroll lock timer routine.

DETAILED DESCRIPTION

Figure 1:
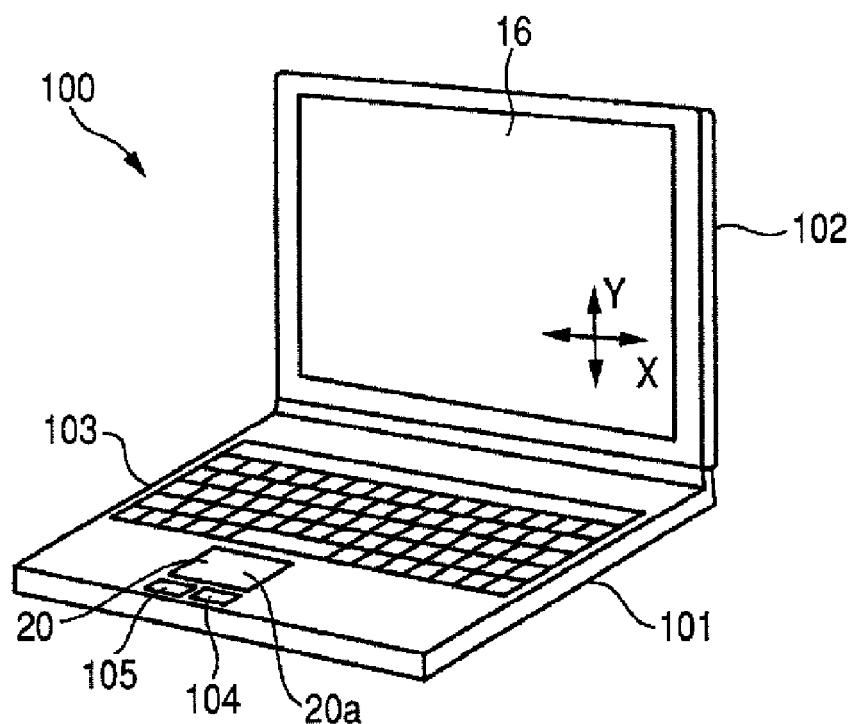
FIG. 1 is a perspective view showing a notebook type personal computer in which a pad type input device is mounted.
Figure 2:
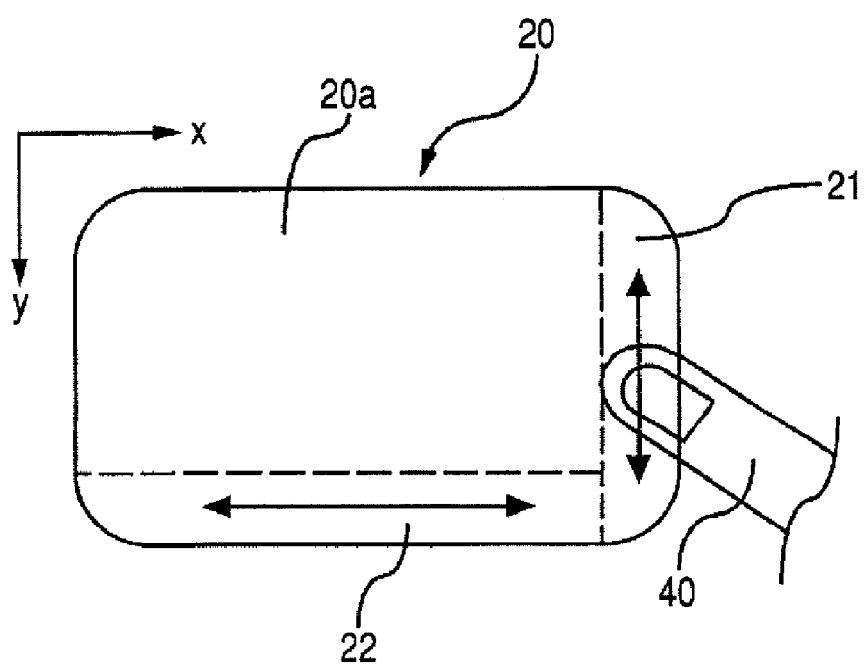
FIG. 2 is a partial enlarged plan view showing an operation surface of the pad type input device mounted in the personal computer shown in FIG. 1.

In one embodiment, as shown in FIG. 1, a notebook type personal computer 100 has a main body 101 and a display casing 102. In the main body 101, a keyboard device 103 is mounted as an operation device. As shown in FIGS. 1 and 2, a pad type input device (touch pad) 20 is mounted in the main body 101. A right push button (right click button) 104 and a left push button (left click button) 105 are provided in the vicinity of the pad type input device 20.

Figure 4:
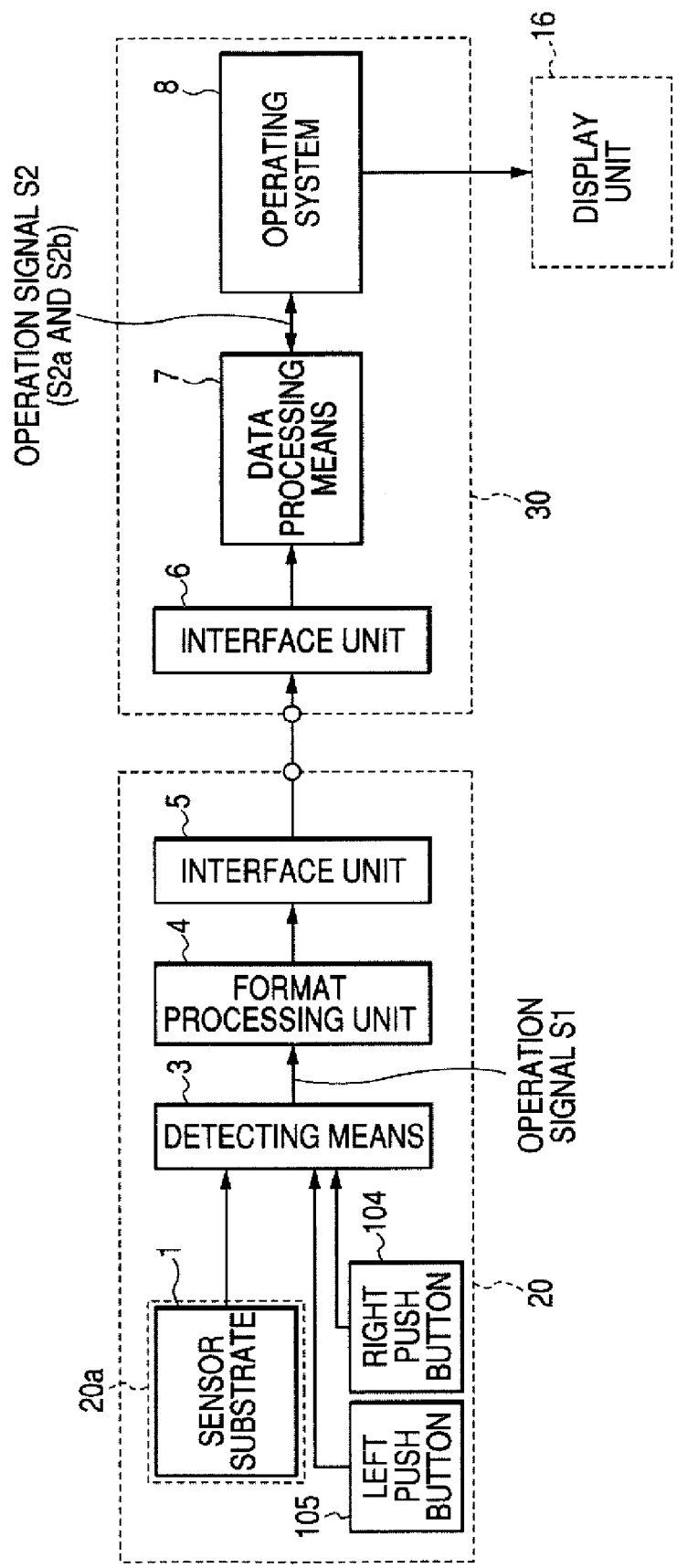
FIG. 4 is a circuit block diagram of the pad type input device shown in FIG. 2.

The keyboard device 103 has a plurality of keys and keyboard switches for detecting the operations of the keys. The operation signals of the keyboard switches are supplied to a data processing means 7 of a main-body control unit 30 shown in FIG. 4 through an unshown processing circuit. As broadly defined herein, a data processing means is, for example, a data processor or any suitable means for processing data.

Figure 3:
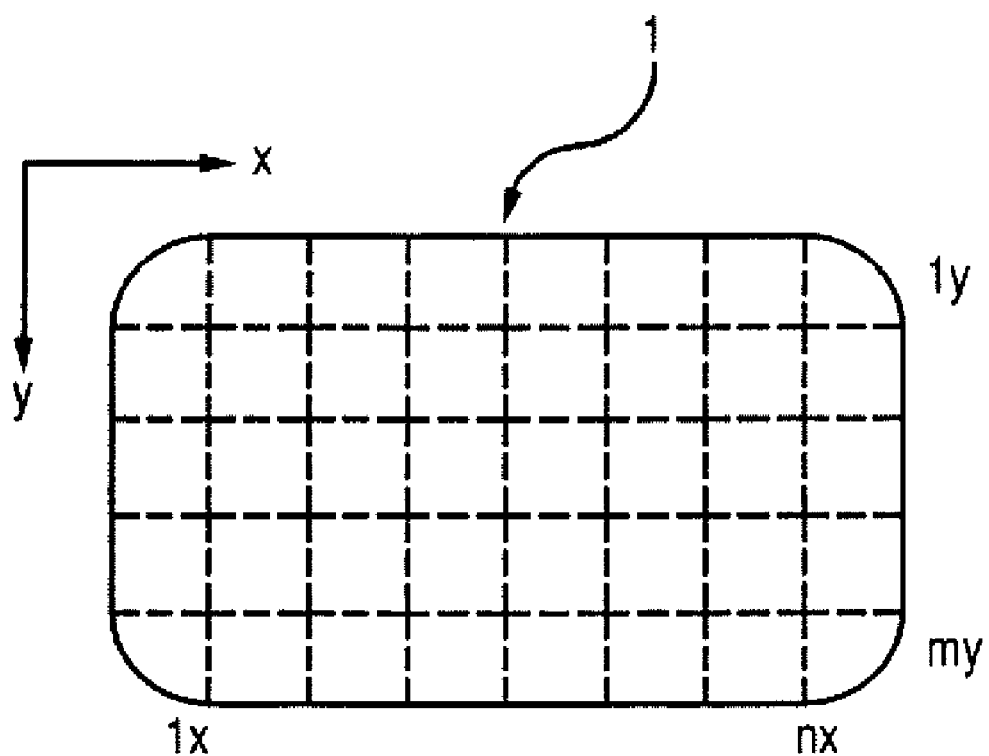
FIG. 3 is a plan view of a sensor substrate which configures the pad type input device.

The pad type input device 20 has an operation surface 20a. A sensor substrate 1, shown in FIG. 3, is provided below the operation surface 20a. The planar shape of the operation surface 20a is not specially limited. In the embodiment shown in FIGS. 1 and 2, the planar shape of the operation surface 20a is rectangular.

The sensor substrate 1 has a plurality of x electrodes $1x$ to $nx$ (n is a positive integer) which are arranged in parallel in a vertical direction (y direction shown in FIG. 3) with a predetermined pitch. A plurality of y electrodes $1y$ to $my$ (m is a positive integer) are arranged in parallel in a horizontal direction (x direction shown in FIG. 3) with a predetermined pitch. The x electrodes $1x$ to $nx$ and the y electrodes $1y$ to $my$ which are arranged perpendicular to each other face each other through a dielectric having predetermined capacitance. Charges are sequentially supplied from an unshown control driving unit to the X electrodes $1x$ to $nx$ through an unshown vertical scanning unit. Charges are sequentially supplied from an unshown control driving unit to the y electrodes $1y$ to $my$ through an unshown horizontal scanning unit.

In the operation surface 20a shown in FIG. 2, a protective layer for covering the sensor substrate 1 is provided. When an operation body 40 including a conductor such as the finger of a person or a touch pen touches any one point of the operation surface 20a, the capacitance between the x electrodes $1x$ to $nx$ and the y electrodes $1y$ to $my$ corresponding to the touched position in the sensor substrate 1 is changed.

Detecting means 3 detects positional information of the operation body 40 based on a change in capacitance to output an operation signal S1. As broadly described herein, the detecting means is, for example, a detector or any suitable means for detecting positional information of the operation body based on a change in capacitance to output an operation signal. The operation signal S1 detected by the detecting means 3 is converted into a predetermined format by a format processing unit 4 and sent from an interface unit 5 to the data processing means 7 which configures the main-body control unit 30 in the main body 101 of the notebook type personal computer 100 through an interface unit 6. In the data processing means 7, a software program called driver software generates an operation signal S2 according to the operation signal S1 from the detecting means 3 and the operation signal S2 is supplied to an operating system (OS) 8. Accordingly, various kinds of information displayed on a display screen of a display unit 16 are controlled based on the operation signal S1.

The operating system 8 allows a predetermined image to be displayed on the display unit 16 according to the operation of an unshown application software program.

As the operation signal S2 generated by the data processing means 7, for example, there are provided a pointer signal S2$b$ for moving a pointer (cursor) displayed on the display unit 16 and a scroll signal S2$a$ for scrolling the display screen.

As shown in FIG. 2, a first scroll area 21 which extends in a vertical direction and has a vertical band shape is provided on the right edge of the operation surface 20a and a second scroll area 22 which extends in a horizontal direction and has a horizontal band shape is provided on the lower edge thereof. The first scroll area 21 is a vertical scroll area and the second scroll area 22 is a horizontal scroll area.

When the operation body 40 is placed on the first scroll area 21 or the second scroll area 22, the detecting means 3 detects the operation body 40. The operation signal S1 is sent to the data processing means 7 through the format processing unit 4, the interface unit 5 and the interface unit 6. The data processing means 7 analyzes the operation state on the operation surface 20a from the operation signal S1. For example, when the operation body 40 placed on the first scroll area slides in the vertical direction (y direction), the data processing means 7 determines that a slide operation is performed in the first scroll area 21 and executes vertical scroll according to the positional information (i.e. movement of a coordinate) indicated by the operation body 40 in the first scroll area 21. Similarly, when the operation body 40 placed on the second scroll area slides in the horizontal direction (x direction), the data processing means 7 determines that a slide operation is performed in the second scroll area 22 and executes horizontal scroll according to the positional information (movement of a coordinate) indicated by the operation body 40 in the second scroll area 22. For example, on the window, the display contents are scrolled in a direction in which the operation body 40 moves by the slide distance of the operation body 40 as a scroll direction (vertical or horizontal direction).

The display contents displayed on the window in the display unit 16 may, for example, be a document preparation screen, a table calculation preparation screen, a schedule screen, map information or a web page on the Internet.

Figure 5:
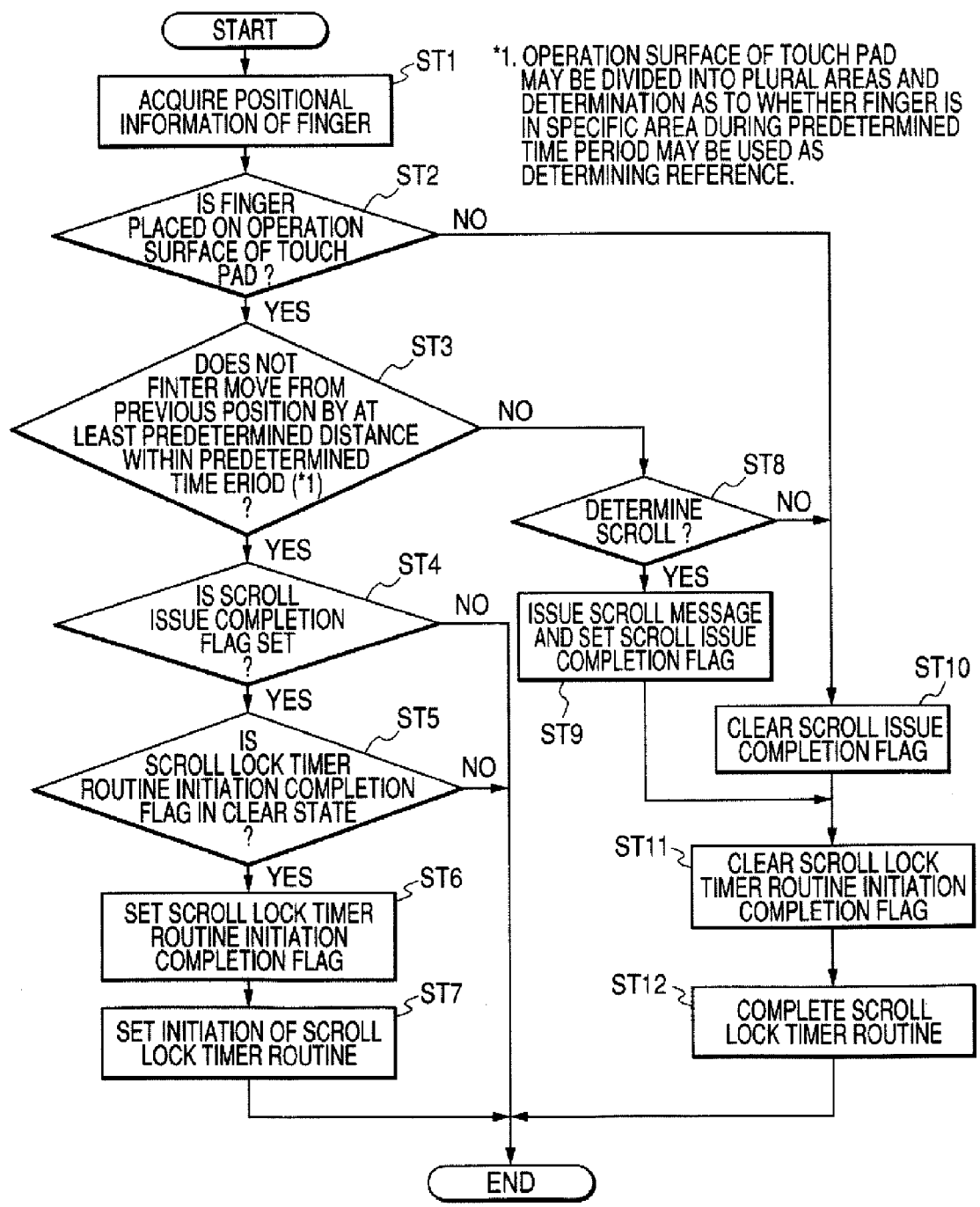
FIG. 5 is a flowchart showing a scroll operation when the pad type input device is used.

The operation of the pad type input device 20 will be described with reference to the flowchart shown in FIG. 5. The operation of the flowchart shown in FIG. 5 is executed by the data processing means 7.

The data processing means 7 acquires the positional information of the operation body 40 placed on the operation surface 20a of the pad type input device 20 (ST1). The data processing means 7 determines whether the operation body 40 is placed on the first scroll area 21, the second scroll area 22 or the other area of the operation surface 20a from the positional information of the operation body 40 acquired in the act ST1 (ST2). The determination is performed based on the operation signal (positional information of the operation body 40) supplied from the detecting means 3 to the data processing means 7.

In one embodiment, when it is determined that the operation body 40 is placed on the first scroll area 21 or the second scroll area 22, the operation progresses to act ST3 via the arrow "yes".

In the act ST3, the operation state of the operation body 40 is determined based on whether the operation body 40 moves from a previous position by at least a predetermined distance within a predetermined time period. For example, if the coordinate of the operation body 40 which is previously detected when the operation body 40 is placed on the first scroll area 21 or the second scroll area 22 is a reference position. The operation state of the operation body 40 is determined based on whether the coordinate of the operation body 40 is in a predetermined radius (range) including the reference position when a predetermined time period elapses.

In one embodiment, when the operation surface 2a is divided into a plurality of areas by the plurality of x electrodes 1x to nx and the plurality of y electrodes 1y to my provided on the sensor substrate 1, it is determined whether the coordinate of the operation body 40 is in the same area or the peripheral area thereof, by comparing an area in which the operation body 40 is previously detected (area including the reference position) and an area which the operation body 40 is located after the elapse of a predetermined time period. A stop time, a stop determination radius and a stop determination area in the act ST3 are specified by software to correspond to scroll areas having various shapes.

When the coordinate of the operation body 40 is in a predetermined area in the act ST3, it is determined that the operation body 40 is in a stop state and the operation progresses to a next act ST4 by an arrow "yes".

The data processing means 7 monitors the movement of the operation body 40 even after the elapse of the predetermined time period and obtains the stop time (time that the operation body stops on the operation surface 20a) t1 until the operation body 40 moves. The stop time t1 is used in the below-described act ST22.

In the act ST4, it is checked whether a "scroll issue completion" flag is set.

In the "scroll issue completion" flag, information as to whether the scroll is executed in any one direction in a previous operation is recorded. When the scroll is executed in any one direction in the previous operation, the "scroll issue completion" flag is set together with the direction. When the scroll is not executed in any one direction, the "scroll issue completion" flag is in a clear state.

The "scroll issue completion" flag is temporarily recorded in, for example, rewritable memory means provided in the main body 101. Accordingly, the data processing means 7 can access the memory means to check whether the "scroll issue completion" flag is in a set state or a non-set state (clear state).

In the act ST4, in the case of "yes", for example, in the case where the "scroll issue completion" flag is in the set state, the operation progresses to a next act ST5. In the act ST5, it is determined whether a scroll lock timer routine initiation completion flag is in a non-set state (clear state) and, if "yes", for example, in the case where the scroll lock timer routine initiation completion flag is in the non-set state, the operation progresses to a act ST6.

In one embodiment, the scroll lock is a state where the scroll operation is continuously executed during the finger is placed on the operation surface 20a (the first scroll area 21 or the second scroll area 22 in the present invention), for example, a state where a program of a scroll operation is regularly executed.

In one embodiment, the scroll lock timer routine is a program for regularly executing the scroll operation. In another embodiment, when the scroll lock timer routine initiation completion flag is in the set state the timer routine is in an initiation completion state. In another embodiment, when the scroll lock timer routine initiation completion flag is in the non-set state the timer routine stops.

In the act ST6, the scroll lock timer routine initiation completion flag which is in the non-set state is set to the set state (initiation state) and subsequently the scroll lock timer routine is initiated (ST7).

The operation of the scroll lock timer routine will be described with reference to the flowchart shown in FIG. 6.

In one embodiment, the data processing means 7 starts the scroll lock timer routine (start of FIG. 6). The scroll lock timer routine initiation completion flag is checked (ST21). When the flag is in the set state, scroll speed information is specified (ST22).

The scroll speed information includes two kinds including, but not limited to: a) the execution interval of the scroll lock timer routine and b) the scroll speed when issuing a scroll message. The execution interval of the scroll lock timer routine is the scroll message issue number per unit time and the scroll message issue number per unit time which is notified to the operating system increases as the interval is small. The scroll speed when issuing the scroll message represents the scroll amount of one scroll message. In one embodiment, as shown in act ST22, two kinds of scroll speed information are acquired.

The scroll speed information in the act ST22 can be determined by acquiring values which are changed depending on a specific operation of an operator, for example, (1) a time that the operation body 40 is placed, i.e., the stop time t1 detected in the act ST3, (2) the size (pressing force) of a Z (height) direction output detected by the detecting means 3, (3) the number of predetermined objects, i.e., the number of fingers placed on the operation surface 20a, (4) the scroll speed of the previous operation, (5) a fixed value, and (6) the distance from the position of the finger which is first placed on the scroll area. The scroll speed information can be set to various values in each case.

In one embodiment, the scroll speed information may be set using application software and, is set by the operator through the display unit 16.

In the act ST23, the data processing means 7 outputs the scroll signal S2a including a "scroll direction of the previous operation" and a "scroll message issue" to the operating system (OS) 8.

The "scroll direction of the previous operation" means the direction of the scroll executed in the previous operation and can be detected from the contents of a "scroll issue completion" flag. The "scroll message issue" means notifying the operating system (OS) 8 that the scroll operation of the window is generated.

The operating system (OS) 8 can recognize the scroll direction and a current operation mode which is in a scroll operation mode when receiving the scroll signal S2a and moves the display screen in the scroll direction based on the scroll direction and the current operation mode. In the act ST24, a time that a next scroll lock timer routine is executed is set after the act ST23.

When the step ST24 is completed, the program is completed in "END" of FIG. 6 and the scroll lock timer routine is repeatedly executed from "START" at a specified repetition interval. The repetition interval of the scroll lock timer routine depends on the scroll speed information acquired in the act ST22. Accordingly, for example, when the scroll speed is set to 30 msec, the scroll lock timer routine is repeatedly executed at an interval of 30 msec. Thus, the display contents intermittently move in the scroll direction at the interval of 30 msec.

In the act ST21, when the scroll lock timer routine initiation completion flag is in the clear state, for example, the operation body 30 is separated from the operation surface 20a during the scroll lock timer routine is repeatedly executed, when the operation body 40 is placed on the operation surface 20a but the position thereof is in an area other than the first scroll area 21 or the second scroll area 22, or when the scroll message is issued by the movement of the operation body 40 on the operation surface 20a. Since the scroll lock timer routine initiation completion flag clears, the execution of the scroll lock timer routine stops (ST25). Since the operating system (OS) 8 can recognize the release of the scroll operation mode and thus stops the scroll of the display screen, because the scroll signal S2a is not received in the act ST23.

In the act ST2 shown in FIG. 5, if "no", for example, the operation body 40 is not placed on the operation surface 20a or when the operation body 40 is placed on the operation surface 20a but the position thereof is in an area other the first scroll area 21 and the second scroll area 22, the operation progresses to a act ST10 and the scroll timer routine initiation completion flag is set to the non-set state (ST11).

In the act ST10, the "scroll issue completion" flag is rewritten to the clear state, for example, the state where the scroll is not executed in the previous operation. Accordingly, in the next operation, when the operation body 40 placed on the operation surface 20a does not move by a predetermined distance within the predetermined time period in the act ST3 (stop state), it is determined to be "yes" in the act ST3 and it is determined to be "no" in the act ST4. Accordingly, the scroll is not executed.

In one operation, when the operation body 40 that is placed on the operation surface 20a moves by the predetermined distance or when the operation body 40 which is in the stop state moves and thus it is determined to "no" in the act ST3, the operation progresses to a step ST8 and a scroll determination is performed.

In the scroll determination, it is determined whether the movement of the operation body 40 on the operation surface 20a satisfies a condition for outputting the scroll message and whether a window (scroll target window) which is currently displayed is a scrollable window. At one embodiment, it is preferable that the window is scrolled in the movement direction of the operation body 40.

The scroll direction is determined based on the movement direction of the operation body 40 as described above. A method of determining the scrollable window can be performed depending on, for example, whether the window has a scroll bar or a specific window attribute.

When the scroll target is determined to the scrollable window, the scroll message is issued and the "scroll issue completion" flag is set (ST9).

When it is determined that the scroll target is not the scrollable window or the movement of the operation body 40 does not satisfy the condition for outputting the scroll message, the operation progresses to the act ST10 by an arrow "no". In the act ST10, the "scroll issue completion" flag is cleared and set to the non-set state (ST10). In the act ST11, the scroll lock timer routine initiation completion flag is set to the non-set state and the scroll lock timer routine is completed (ST12) and the operation progresses to "END". The operation is executed from "START" when a next scroll lock timer routine starts.

In the act ST4, when the "scroll issue completion" flag is in the non-set state (clear state), for example, when the scroll is not executed in the previous operation, the scroll direction is obscure and thus the operation progresses to "END" by an arrow "no". A next operation starts at "START".

In the act ST5, when it is determined that the scroll lock timer routine initiation completion flag is not in the non-set state (is in the set state), the operation progresses to "END" by the arrow "no" and a next operation starts at "START".

in one embodiment of the pad type input device 20, the movement of the operation body 40 which is previously placed on the first scroll area 21 or the second scroll area 22 of the operation surface 20a is detected (if "no" in the step ST3) and the scroll determination is performed to obtain the execution of the scroll and the scroll direction (ST8).

In one embodiment, if it is determined that the operation body 40 does not move under a predetermined condition when the subsequent movement of the operation body 40 is detected (if "yes"), the display screen can be continuously scrolled during the operation body 40 is placed on the first scroll area 21 or the second scroll area 22 (ST22 and ST23).

Accordingly, when the scroll is continuously executed, the operation body 40 slightly moves in the scroll direction and remains on the spot in the stop state. Accordingly, the window of the screen display can be continuously scrolled in the scroll direction. Thus, the operation body 40 need not move by a long distance from the first scroll area 21 to the continuous scroll area provided in the end thereof. For example, it is possible to reduce the operation burden of the operator.

A first area for general scroll and second areas for continuous scroll which are provided on the both ends thereof need not be separated in the pad type input device and the whole first scroll area 21 (or the whole second scroll area 22) can be used as a area for general scroll and continuous scroll and thus operability can be improved.

Although a function using the driver software is included in the above-described embodiment, the present embodiments are not limited thereto. All functions can be included in a device IC (firmware) except the case where it is determined whether the current window is the scrollable window in the act ST8.

Although both the first scroll area 21 and the second scroll area 22 are included in the above-described embodiment, the present embodiments are not limited thereto. Only any one of the first scroll area 21 and the second scroll area 22 may be included.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A pad type input device comprising:
an operation surface which includes a scroll area operated by an operation body;
a detector that is operative to detect a touch position of the operation body placed on the operation surface as positional information on a coordinate plane; and
a data processor that is operative to acquire an operation signal obtained by the detector to perform a predetermined process,
wherein the data processor executes a scroll lock timer routine when the operation body placed on the scroll area is in a stop state where the operation body does not move, even after a predetermined time elapses,
wherein the scroll lock timer routine includes specifying a scroll speed information, outputting a scroll signal that moves display contents in a predetermined scroll direction, the scroll signal including the scroll speed information, and setting the scroll lock timer which determines a duration of time until next scroll lock timer routine is executed, and wherein the scroll lock timer routine is repeatedly executed based on the scroll lock timer until the operation body is not placed on the scroll area.

2. The pad type input device according to claim 1, wherein the data processor is operative to acquire a movement direction of the operation body, which is previously detected, as a scroll direction, and output the scroll signal including the scroll direction when it is determined that the operation body is in the stop state.

3. The pad type input device according to claim 1, wherein the scroll signal includes scroll speed information that controls a scroll speed.

4. The pad type input device according to claim 2, wherein the scroll area has a first scroll area for vertical scroll, a second scroll area for horizontal scroll, or both.

5. A scroll controlling method of a pad type input device including an operation surface which includes a scroll area operated by an operation body, a detector which detects a touch position of the operation body placed on the operation surface as positional information on a coordinate plane, a data processor which acquires an operation signal obtained by the detecting means to perform a predetermined process, and a display which displays display contents processed by the data processing means, the method comprising:

setting a scroll lock timer which determines a duration of time until next scroll lock timer routine is executed;

determining whether the operation body placed on the scroll area is in a stop state where the operation body does not move, even after a predetermined time elapses wherein the scroll lock timer routine is repeatedly executed based on the scroll lock timer until the operation body is not placed on the scroll area, and outputting a scroll signal for moving the display contents in a predetermined scroll direction to an operating system when it is determined that the operation body is in the stop state.

6. The pad type input device according to claim 1, wherein the data processor is further operative to:

when the operation body moves from a previous position by at least a predetermined distance within a predetermined time period, determine whether or not a scroll operation is performed, and output the scroll signal if a scroll operation is performed;

when the operation body does not move from the previous position by at least the predetermined distance within the predetermined time period, determine whether or not a scroll operation is performed in the previous operation, and initiate the scroll lock timer routine if a scroll operation is performed in the previous operation.

* * * * *